(12) United States Patent
Peng et al.

(10) Patent No.: US 11,063,790 B2
(45) Date of Patent: Jul. 13, 2021

(54) NONLINEAR RECEIVER, ASYMMETRIC DECISION FEEDBACK EQUALIZATION CIRCUIT AND METHOD

(71) Applicant: PhotonIC Technologies (Shanghai) Co., Ltd., Shanghai (CN)

(72) Inventors: Yi Peng, Shanghai (CN); Rui Bai, Shanghai (CN); Xin Wang, Shanghai (CN); Pei Jiang, Shanghai (CN)

(73) Assignee: PhotonIC Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/746,875

(22) Filed: Jan. 19, 2020

(65) Prior Publication Data

US 2020/0396109 A1    Dec. 17, 2020

(30) Foreign Application Priority Data

Jun. 11, 2019   (CN) .......................... 2019104990925

(51) Int. Cl.
*H04L 25/03*      (2006.01)
(52) U.S. Cl.
CPC .............................. *H04L 25/03057* (2013.01)
(58) Field of Classification Search
CPC ................................................ H04L 25/03057
USPC ......................................................... 375/233
See application file for complete search history.

(56) References Cited

U.S. PATENT DOCUMENTS

| 5,517,527 A | * | 5/1996 | Yu ........................... H04B 3/142 375/233 |
| 2005/0084046 A1 | * | 4/2005 | Seo ........................ H04L 7/0058 375/350 |
| 2009/0154941 A1 | * | 6/2009 | Mateosky ................ H04L 1/005 398/208 |
| 2010/0104544 A1 | * | 4/2010 | Atala ....................... A61P 13/12 424/93.7 |

* cited by examiner

*Primary Examiner* — Shuwang Liu
*Assistant Examiner* — Gina M McKie (57) ABSTRACT

The present disclosure provides a non-linear receiver, an asymmetric decision feedback equalization circuit and method, including: converting an optical signal emitted by a laser device into an electrical signal; obtaining a compensation amplitude of a current data in the electrical signal by obtaining an actual amplitude of the current data, and compensating the current data based on a logic value of k prior data of the current data and a feedback coefficient corresponding to the prior data; comparing the compensation amplitude of the current data with a decision threshold to determine the logic value of the current data; the feedback coefficient is an absolute value of an influence amount of the prior data on an amplitude of the current data, and k is a positive integer. The present disclosure can overcome the bit error problem of the receiver and reduce jitter of the clock recovered by the clock recovery circuit.

10 Claims, 7 Drawing Sheets

NONLINEAR RECEIVER, ASYMMETRIC DECISION FEEDBACK EQUALIZATION CIRCUIT AND METHOD

CROSS REFERENCE TO RELATED APPLICATION

This application claims the benefit of priority to a Chinese Patent Application No. CN2019104990925, filed with SIPO on Jun. 11, 2019, the content of which is incorporated herein by reference in its entirety.

BACKGROUND

Field of Disclosure

The present disclosure relates to the field of optical communication, and in particular, to a nonlinear receiver, an asymmetric decision feedback equalization circuit and method.

Description of Related Arts

With the rise of commercial use of 5G, Internet of Things and artificial intelligence, optical communication core chips, as the core device of the Internet of Everything, is a key area for future development.

An optical communication interface chip mainly includes an electric-to-light part and a light-to-electric part, electric-to-light is realized by using an optical device driving circuit to convert an electrical signal into an optical signal. In this process, due to the nonlinear problem of an optical device in a transmitting end, the emitted optical eye diagram will be seriously nonlinear or distorted, which is manifested in the asymmetry of the eye diagram, the inconsistency of the rise time and the fall time, overshoot or undershoot. In the process of recovering the electrical signal from the optical eye diagram by a receiver, the time margin of a sampling circuit is affected by the nonlinearity of the optical eye diagram, resulting in a large number of bit errors. At the same time, jitter of the clock signal recovered by the clock recovery circuit is too large to meet the requirements of the protocol for jitter tolerance. Furthermore, more severe nonlinearities can cause the clock recovery circuit to fail to lock. This is unacceptable for the entire optical communication system.

Figure 1:
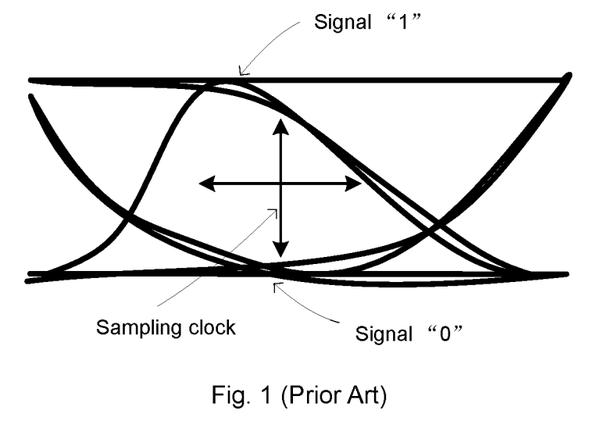
FIG. 1 is a diagram illustrating an asymmetric PAM-2 (or NRZ) eye diagram of optical signal generated by nonlinearity of laser device in the prior art.

FIG. 1 shows the asymmetric eye diagram of optical signal generated by the nonlinearity of the laser device under PAM-2 (or NRZ) coding. In different data modes, the rise and fall times of the signal are inconsistent. The fall time of the signal from "1" to "0" is significantly greater than the rise time of the signal from "0" to "1". According to the principle of the clock recovery circuit, the sampling clock of the receiving end is right at the middle position of the eye diagram, so that the left and right timing margins of the sampling clock are not symmetrical, which is detrimental to the jitter tolerance of the system.

Figure 2:
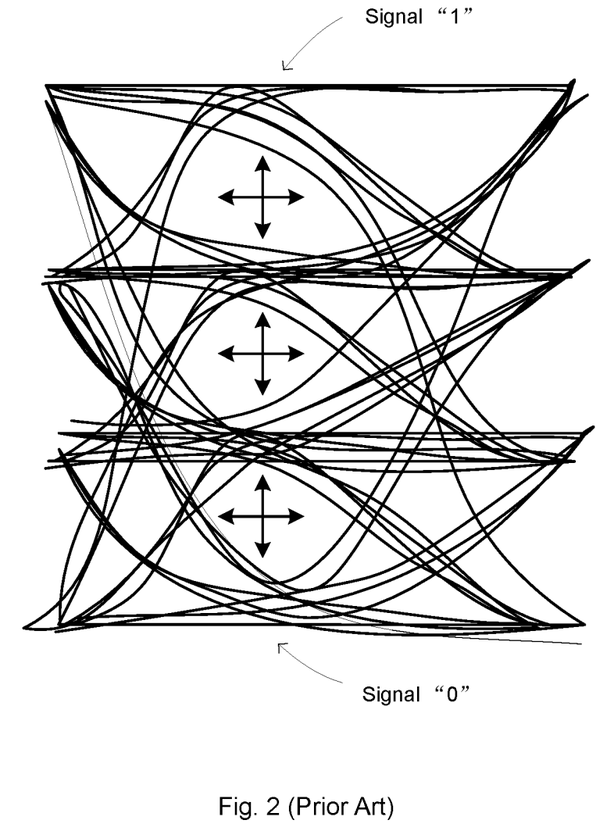
FIG. 2 is a diagram illustrating an asymmetric PAM-4 eye diagram of optical signal with nonlinearity of laser device, noise, and inter-symbol interference in the prior art.

FIG. 2 shows the eye diagram of optical signal with laser nonlinearity, noise and inter-symbol interference (ISI) under PAM-4 coding. The asymmetry of the eye diagram, the inconsistency of the rise time and the fall time, and the overshoot or undershoot are obvious.

SUMMARY OF THE PRESENT DISCLOSURE

The present disclosure provides a non-linear receiver, an asymmetric decision feedback equalization circuit and method for solving the problems of asymmetry, rise time and fall time inconsistency, overshoot or undershoot of the eye diagram stemmed from the nonlinearity of the laser device.

The present disclosure provides an asymmetric decision feedback equalization method, at least including: converting an optical signal emitted by a laser device into an electrical signal; obtaining a compensation amplitude of a current data in the electrical signal by obtaining an actual amplitude of the current data, and compensating the current data based on a logic value of k prior data of the current data and a feedback coefficient corresponding to the prior data; comparing the compensation amplitude of the current data with a decision threshold to determine a logic value of the current data; the feedback coefficient is an absolute value of an influence amount of the prior data on an amplitude of the current data, and k is a positive integer.

Preferably, compensating the current data includes: sequentially acquiring the prior data of the current data to obtain the compensation amplitude of the current data; when the prior data is at logic high, subtracting the feedback coefficient corresponding to the prior data from the actual amplitude of the current data; and when the prior data is at logic low, adding the feedback coefficient corresponding to the prior data to the actual amplitude of the current data.

More preferably, the asymmetric decision feedback equalization method further includes: acquiring a logic value of each prior data, obtaining a compensation value by multiplying the logic value of each prior data by a corresponding feedback coefficient and then inverting to obtain a compensation value, adding each compensation value and adding the added compensation value to the actual amplitude of the current data.

More preferably, obtaining the feedback coefficient includes: when the laser device emits a logic high pulse, obtaining the absolute value of the influence amount of the prior data on the amplitude of the current data when the prior data is at logic high based on a waveform of the logic high pulse; and when the laser device emits a logic low pulse, obtaining the absolute value of the influence amount of the prior data on the amplitude of the current data when the prior data is at logic low based on a waveform of the logic low pulse.

The present disclosure further provides an asymmetric decision feedback equalization circuit for implementing the above-described asymmetric decision feedback equalization method, and the asymmetric feedback equalization circuit at least includes: a data input module to receive input data and outputting a differential signal of each data; k compensation modules respectively connected to an output end of the data input module, to obtain a compensation amplitude of a current data by compensating the current data based on the logic value of prior data of the current data and an feedback coefficient corresponding to the prior data; a comparison module connected to an output end of the data input module, to compare the compensation amplitude of current data with a decision threshold, to determine a logic value of the current data; k trigger modules in one-to-one correspondence with the compensation modules, sequentially connected in series to an output end of the comparison module to sequentially obtain a logic value of each prior data of the current data; k is a positive integer.

Preferably, the compensation module includes a first compensation unit and a second compensation unit; the first compensation unit is connected to an inverted output of the data input module; the second compensation unit is connected to a positive output of the data input module; the first compensation unit and the second compensation unit are connected to the same prior data, and the first compensation unit or the second compensation unit is selectively turned on based on the amplitude of the prior data.

More preferably, the first compensation unit includes a first switch, one end of the first switch is connected to an inverted output of the data input module, the other end of the first switch is connected to a first compensation current; the second compensation unit includes a second switch, one end of the second switch is connected to the positive output of the data input module, and the other end of the second switch is connected to a second compensation current.

More preferably, the first compensation unit includes a first NMOS transistor and a second NMOS transistor, sources of the first NMOS transistor and the second NMOS transistor are connected to the first compensation current, drain of the first NMOS transistor is connected to the inverted output node of the data input module, gate of the first NMOS transistor is connected to an inverted output signal of the prior data, drain of the second NMOS transistor is connected to supply, gate of the second NMOS transistor is connected to a reference signal; the second compensation unit includes a third NMOS transistor and a fourth NMOS transistor, sources of the third NMOS transistor and the fourth NMOS transistor are connected to the second compensation current, drain of the third NMOS transistor is connected to supply, gate of the third NMOS transistor is connected to the reference signal, drain of the fourth NMOS transistor is connected a positive output node of the data input module, gate of the fourth NMOS transistor is connected to a positive output signal of the prior data; the reference signal is between an inverted signal and a positive signal of the prior data.

The present disclosure further provides an asymmetric decision feedback equalization circuit for implementing the above-described asymmetric decision feedback equalization method, and the asymmetric feedback equalization circuit at least includes: a compensation module to respectively compensate the amplitude of the current data based on a combination of different feedback coefficients corresponding to a sequence of k prior data, and latch the compensation data as a prior data of the next current data; and a selection module connected to an output end of the compensation module, to determine feedback coefficients corresponding to each prior data, thereby determining the amplitude of current data after compensation; k is a positive integer.

Preferably, the selection module includes k level alternative units and triggers connected to each alternative unit, the number of alternative units at each level is decreasing exponentially by 2, and feedback coefficients corresponding to the sequence of prior data are different.

The present disclosure also provides a non-linear receiver, at least including: a continuous time linear equalization circuit to receive an electrical signal converted by an optical signal emitted by a laser device, and improve performance of the electrical signal; the above-mentioned asymmetric decision feedback equalization circuit connected to the output of the continuous time linear equalization circuit, to compensate the signal after continuous time linear equalization circuit; and a clock data recovery circuit connected to the output of the asymmetric decision feedback equalization circuit, to recover a sampling clock and data.

As stated above, the nonlinear receiver, the asymmetric decision feedback equalization circuit and method of the present disclosure have the following beneficial effects:

The nonlinear receiver and the asymmetric decision feedback equalization circuit and method of the present disclosure overcome the problem of reduced sampling timing margin due to the asymmetric optical eye diagram by adjusting the feedback coefficients according to different data sequences, thus improving the system robustness under different processes, supply voltages and temperatures, reducing the jitter of the sampling clock recovered by the clock recovery circuit at the same time, thereby reducing the system error rate.

In addition to the use in the optical to electrical system, the non-linear receiver, the asymmetric decision feedback equalization circuit and method of the present disclosure can overcome the bit error problem of the receiver caused by unequal rise time and fall time of the output signal due to pull-up (or pull-down) impedance mismatch of transmitter driver circuit in the high-speed interface circuit.

DESCRIPTION OF COMPONENT MARK NUMBERS

1 Asymmetric decision feedback equalization circuit
11 Data input module
12a-12c Compensation module
13 Comparison module
14a-14b Trigger module
2 Asymmetric decision feedback equalization circuit
21 Compensation module
211 First compensation unit
211a First comparator
211b First trigger
22 Selection module 221 First alternative unit
222 Second alternative unit
223 Fifth trigger
224 Sixth trigger
225 Third alternative unit
226 Seventh trigger
3 Nonlinear receiver
4 Continuous time linear equalization circuit
5 Asymmetric decision feedback equalization circuit
6 Clock data recovery circuit

DETAILED DESCRIPTION OF THE
PREFERRED EMBODIMENTS

The embodiments of the present disclosure will be described below. Those skilled can easily understand other advantages and effects of the present disclosure according to contents disclosed by the specification. The present disclosure can also be implemented or applied through other different specific embodiments. Various modifications or changes can also be made to all details in the specification based on different points of view and applications without departing from the spirit of the present disclosure.

It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complex.

Embodiment 1

Figure 3:
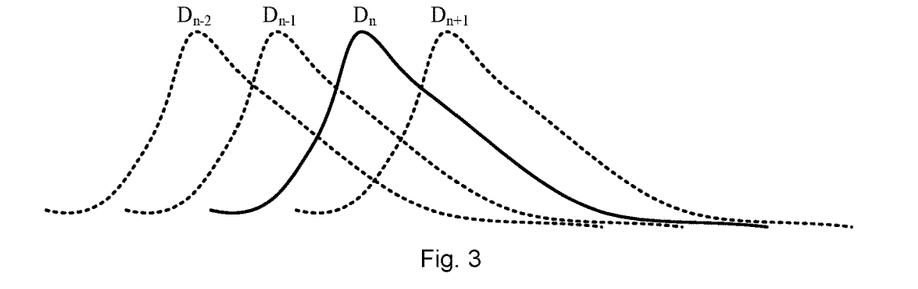
FIG. 3 is a diagram illustrating the generation of inter-symbol interference.

As shown in FIG. 3, due to nonlinear characteristics of the laser, signals passing through the channel are distorted. By observing the asymmetric signal waveform, it can be found that the asymmetry is caused by unequal rise time and fall time of different data sequences. Taking the current data $D_n$ as an example, the waveform of the current data $D_n$ has a characteristic of rising fast (compared to falling) and falling slow (compared to rising). Therefore, when the waveform of the current data $D_n$ extends to the adjacent data, the adjacent data will be affected. When data are continuously transmitted, the mutual influence between the data causes inter-symbol interference. Once the interference causes the sampled data to exceed the decision threshold range, bit error happens.

Figure 4:
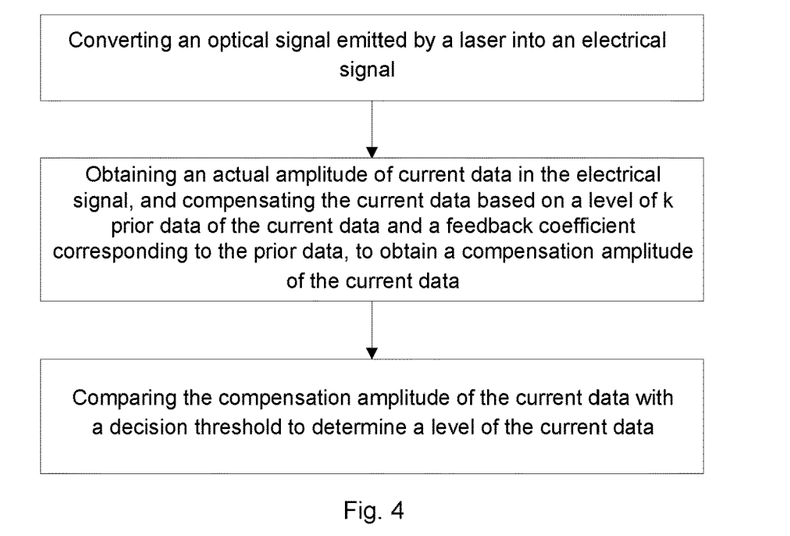
FIG. 4 is a diagram illustrating a flow chart of an asymmetric decision feedback equalization method according to the present disclosure.

As shown in FIG. 4, the present embodiment provides an asymmetric decision feedback equalization method for compensating the asymmetry of data and solving the bit error problem. The asymmetric decision feedback equalization method includes:

1) Converting an optical signal emitted by a laser device into an electrical signal.

Specifically, the optical signal emitted by the laser device is transmitted to the receiver through a channel, and is converted into a corresponding electrical signal by a photoelectric conversion device at the receiver side.

2) Obtaining an actual amplitude $AMP_{actual}$ of current data $D_n$ in the electrical signal, and compensating the current data $D_n$ based on k prior data of the current data $D_n$ and feedback coefficient corresponding to the k prior data, to obtain a compensated amplitude $AMP_{compensation}$ of the current data $D_n$, k is a positive integer.

Specifically, the electrical signal is sampled based on a sampling clock of the current data $D_n$ to obtain an actual amplitude $AMP_{actual}$ of the current data $D_n$.

Specifically, the current data $D_n$ is further compensated based on a logical value of the prior data and a feedback coefficient corresponding to the prior data. When the prior data is at logic high, the feedback coefficient corresponding to the prior data is subtracted from the actual amplitude $AMP_{actual}$ of the current data $D_n$. When the prior data is at logic low, the feedback coefficient corresponding to the prior data is added to the actual amplitude $AMP_{actual}$ of the current data $D_n$. In this embodiment, taking the first two prior data of the current data $D_n$ as an example, in actual use, the number k of prior data for compensation may be set according to the impulse response characteristic of the channel.

Figure 5:
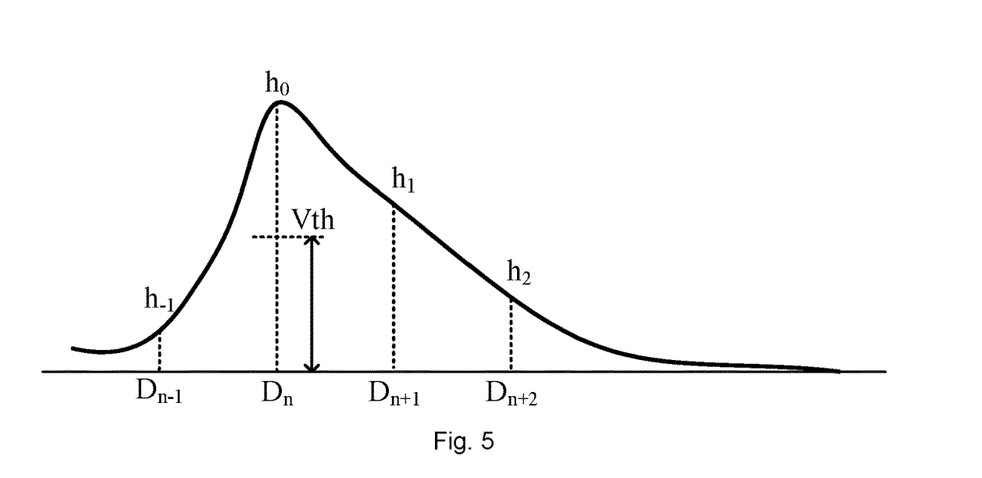
FIG. 5 is a diagram illustrating the principle of determining the feedback coefficient when the prior data is at logic high according to the present disclosure.
Figure 6:
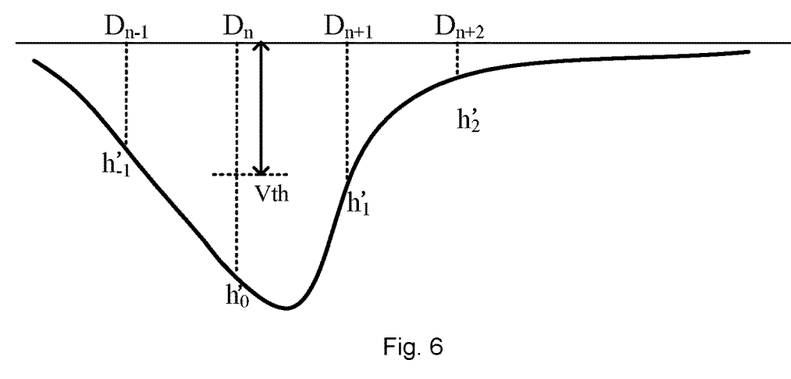
FIG. 6 is a diagram illustrating the principle of determining the feedback coefficient when the prior data is at logic low according to the present disclosure.

More specifically, the method for obtaining the feedback coefficient in this embodiment is as follows. As shown in FIG. 5, a logic high pulse is transmitted by the laser, and data " . . . 0001000 . . . " is input, the data $D_n$ is at logic high. The sampling clock samples the amplitude of $h_0$ after passing the channel (the position of each dotted line in the figure corresponds to each sampling clock). For the data $D_{n-1}$, when its subsequent data $D_n$ is at logic high, the amplitude is increased by $h_{-1}$. For the data $D_{n+1}$, when its prior data $D_n$ is at logic high, the amplitude is increased by $h_1$. For the data $D_{n+2}$, when the prior data $D_n$ is at logic high, the amplitude is increased by $h_2$. According to this, the influence on the amplitude of the current data can be obtained when the prior data is at logic high based on the waveform of the logic high pulse, and the absolute value of the influence is taken as the feedback coefficient of the current data when the prior data is at logic high. Similarly, as shown in FIG. 6, a logic low pulse is transmitted through the laser, and data " . . . 1110111 . . . " is input, where the data $D_n$ is at logic low, and the sampling clock samples the amplitude of $h'_n$ after passing the channel. For the data $D_{n-1}$, when its subsequent data $D_n$ is at logic low, the amplitude is decreased by $h'_{-1}$. For the data $D_{n+2}$, when its prior data $D_n$ is at logic low, the amplitude is decreased by $h'_1$. For the data $D_{n+2}$, when its prior data $D_n$ is at logic low, the amplitude is decreased by $h'_2$. According to this, the influence on the amplitude of the current data can be obtained when the prior data is at logic low based on the waveform of the logic low pulse, and the absolute value of the influence is taken as the feedback coefficient of the current data when the prior data is at logic low.

Figure 7:
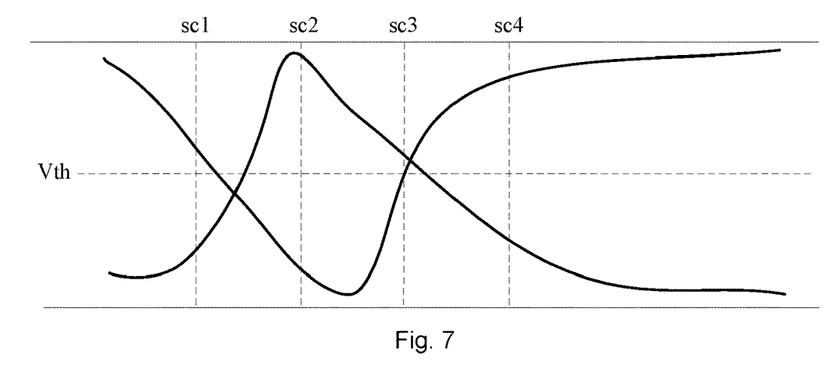
FIG. 7 is a diagram illustrating the principle of asymmetric eye diagram according to the present disclosure.

Further, as shown in FIG. 7, in the asymmetric eye diagram, the high and low amplitudes of the signal at the sampling clock (sc1 and sc3 are signal edge sampling clock, and sc2 and sc4 are signal amplitude sampling clock) are not symmetrical in regard to decision threshold of the comparator. Therefore, in general, the values of the feedback coefficients corresponding to the sequence of the same prior data are not equal (the case where the two are equal is not excluded), that is, $h_1 \neq h'_1$, $h_2 \neq h'_2$.

It should be noted that, in order to explain the principle, the present embodiment only takes a logic high pulse and a logic low pulse as an example. In actual use, the feedback coefficient can be adjusted according to other characteristics of the laser, which will not be described in detail herein.

3) Comparing the compensation magnitude $AMP_{compensation}$ of the current data $D_n$ with a decision threshold Vth to determine the logic value of the current data $D_n$.

Specifically, when the compensation amplitude $AMP_{compensation}$ of the current data $D_n$ is less than the decision threshold Vth, determining that the current data $D_n$ is at logic low. When the compensation amplitude $AMP_{compensation}$ of the current data $D_n$ is greater than the decision threshold Vth, determining that the current data $D_n$ is at logic high.

Figure 8:
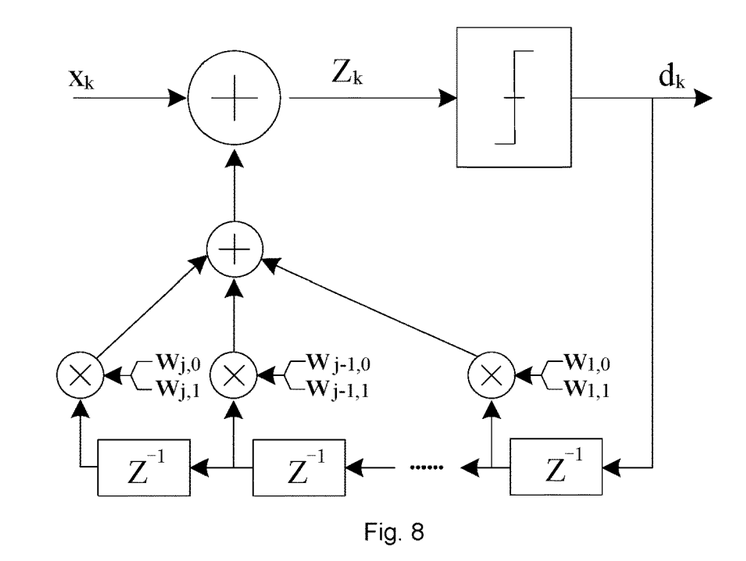
FIG. 8 is a diagram illustrating the logic blocks of asymmetric decision feedback equalization method according to the present disclosure.

As shown in FIG. 8, as an implementation example of this embodiment, the principle of the asymmetric decision feedback equalization method of the present disclosure is as follows:

Specifically, the logic value of each prior data is acquired by comparison module and delay, multiplying the logic value of each prior date with corresponding feedback coefficient and then inverting the product to obtain a compensation value. $W_{1,0}=-h'_1 \ldots W_{i-1,0}=-h'_{i-1}$, $W_{j,0}=-h'_j$, $W_{1,1}=-h_1 \ldots W_{j-1,1}=-h_{j-1}$, $W_{j,1}=-h_j$.

Specifically, the compensation values are added, and the added value is added to the original signal $X_k$ of the current data $D_n$, thereby obtaining the compensated signal $Z_k$ of the current data $D_n$. The compensated signal $Z_k$ of the current data $D_n$ is compared with the decision threshold Vth to obtain the data value $d_k$, thereby determining the logic value of the current data. The logic value of the current data is used as the prior data of the next data.

Examples before and after compensation are given in the following table to illustrate the effects of the present disclosure:

| $D_{n-2}$ | $D_{n-1}$ | $D_n$ | $D_{n+1}$ | $h_1$ | $h'_1$ | $h_2$ | $h'_2$ | $AMP_{actual}$ | $AMP_{compensation}$ | Data |
|---|---|---|---|---|---|---|---|---|---|---|
| 1 | 1 | 1 | 1 | 0.35 | 0.5 | 0.165 | 0.125 | 1 | 0.485 | 1 |
| 1 | 1 | -1 | 1 | 0.35 | 0.5 | 0.165 | 0.125 | 0.14 | -0.485 | 0 |
| -1 | -1 | 1 | -1 | 0.35 | 0.5 | 0.165 | 0.125 | -0.03 | 0.485 | 1 |
| -1 | -1 | -1 | -1 | 0.35 | 0.5 | 0.165 | 0.125 | -1.11 | -0.485 | 0 |

(1) Assuming that the data transmitted from the transmitter side is "1111", and the logic value of each data is 1111 (where 1 indicates logic high). For the current data $D_n$, the actual amplitude $AMP_{actual}$ after passing the channel is 1. Because the decision threshold is 0, the uncompensated decision result is correct. After compensation, the compensation amplitude $AMP_{compensation}$ satisfies:

$$AMP_{compensation}=AMP_{actual}+D_{n-1}\times(-h_1)+D_{n-2}\times(-h_2)=1-1\times0.35-1\times0.165=0.485,$$

Then, since the decision threshold Vth is 0, the final decision data is "1", and the compensated decision result is correct.

(2) Assuming that the data transmitted from the transmitter side is "1101", the logic value of each data is 11-11 (where 1 indicates logic high, and -1 indicates logic low). For the current data $D_n$, the actual amplitude $AMP_{actual}$ after passing the channel is 0.14. Because the decision threshold Vth is 0, the uncompensated decision result is wrong. After compensation, the compensation amplitude $AMP_{compensation}$ satisfies:

$$AMP_{compensation}=AMP_{actual}+D_{n-1}\times(-h_1)+D_{n-2}\times(-h_2)=0.14-1\times0.5-1\times0.125=-0.485$$

Then, since the decision threshold Vth is 0, the final decision data is "0", and the compensated decision result is correct.

(3) Assuming that the data transmitted from the transmitter side is "0010", the logic value of each data is -1-11-1 (where 1 indicates logic high, and -1 indicates logic low), and for the current data $D_n$, the actual amplitude $AMP_{actual}$ after passing through the channel is -0.03. Since the decision threshold Vth is 0, the uncompensated decision result is wrong. After compensation, the compensation amplitude $AMP_{compensation}$ satisfies:

$$AMP_{compensation}=AMP_{actual}+D_{n-1}\times(-h'_1)+D_{n-2}\times(-h'_2)=-0.03+1\times0.35+1\times0.165=0.485,$$

Then, since the decision threshold Vth is 0, the final decision data is "1", and the compensated decision result is correct.

(4) Assuming that the data transmitted from the transmitter side is "0000", the logic value of each data is -1-1-1-1 (where -1 indicates logic low), and for the current data $D_n$, the actual amplitude $AMP_{actual}$ after passing the channel is -1.11. Since the decision threshold Vth is 0, the uncompensated decision result is correct. After compensation, the compensation amplitude $AMP_{compensation}$ satisfies:

$$AMP_{compensation}=AMP_{actual}+D_{n-1}\times(-h'_1)+D_{n-2}\times(-h'_2)=-1.11+1\times0.5+1\times0.125=-0.485,$$

Then, since the decision threshold Vth is 0, the final decision data is "0", and the compensated decision result is correct.

It can be seen from the above example that the actual amplitude of the signal before compensation is asymmetric, for $AMP_{actual}$, the maximum is 1, and the minimum is -1.11. After compensation, the signal amplitude is symmetric, for $AMP_{compensation}$, the maximum is 0.485 and the minimum is -0.485.

It can be seen that the error rate of uncompensated data is much higher than the error rate of compensated data. After being compensated by the asymmetric decision feedback equalization method of the present disclosure, the receiver side can recover distorted data with less errors, and the problem of reduced sampling timing margin caused by asymmetric eye diagram can be solved, thus improving the system robustness under different processes, power supply voltages and temperatures, and reducing the jitter of the sampling clock recovered by the clock recovery circuit, thereby reducing the system error rate.

It should be noted that the present embodiment is only used as an example. In actual applications, the impact amplitude of the current data on the data before and after it and the amount of the impacted data are based on the actual laser device and channel characteristics, and are not limited to this embodiment.

It should be noted that the present disclosure is applicable to any pulse amplitude modulation (PAM-N) coding scheme (such as PAM-2, PAM-4, PAM-8, etc.), and is applicable to a receiver framework of any sampling rate, such as full-rate sampling, half-rate sampling and quarter-rate sampling.

Embodiment 2

Figure 9:
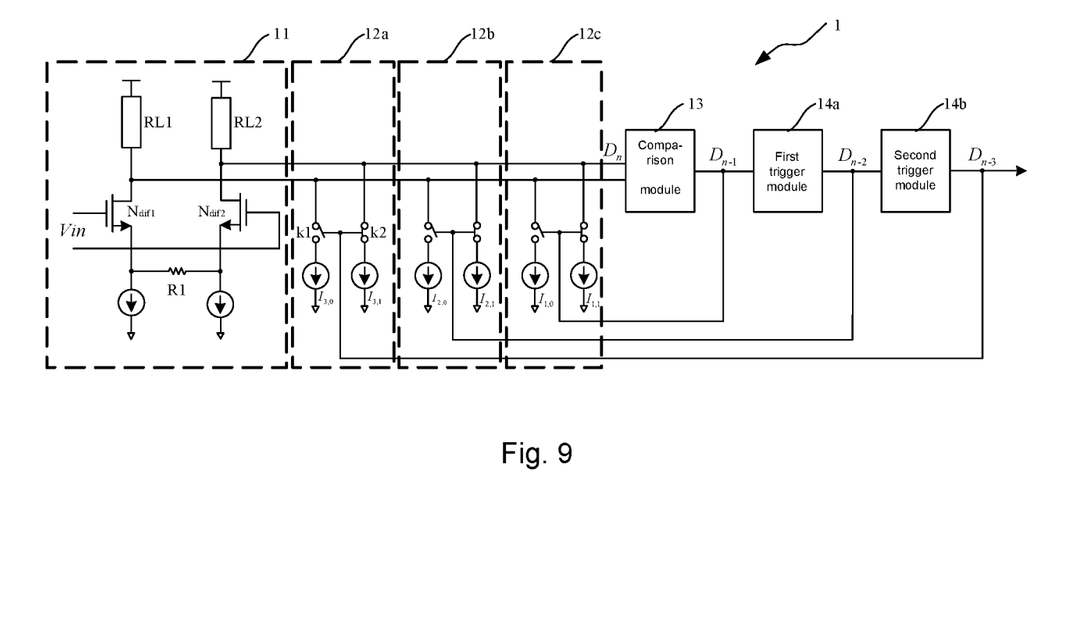
FIG. 9 is a diagram illustrating an example of the asymmetric decision feedback equalization according to the present disclosure.
Figure 10:
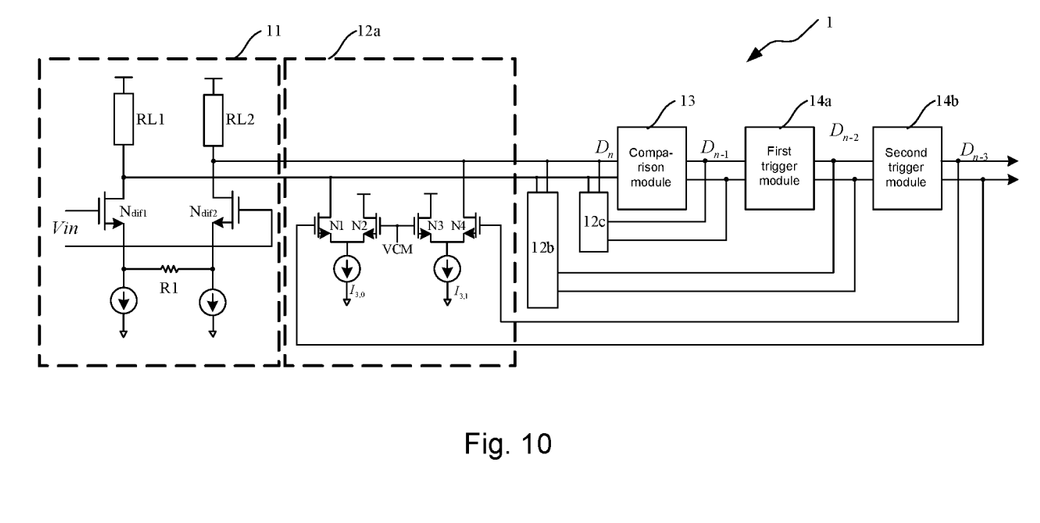
FIG. 10 is a diagram illustrating another example of the asymmetric decision feedback equalization according to the present disclosure.

As shown in FIG. 9 and FIG. 10, the present embodiment provides an asymmetric decision feedback equalization circuit 1 for implementing the asymmetric decision feedback equalization method of the first embodiment. The asymmetric decision feedback equalization circuit 1 includes:

A data input module 11, k compensation modules, a comparison module 13 and k trigger modules 14.

As shown in FIG. 9 and FIG. 10, the data input module 11 receives input data Vin and outputs a differential signal of each data.

Specifically, the data input module 11 includes a first differential input pair transistor $N_{dif1}$ and a second differential input pair transistor $N_{dif2}$. Gates of the first differential input pair transistor $N_{dif1}$ and the second differential input pair transistor $N_{dif2}$ are connected to the input data Vin. The sources of the first differential input pair transistor $N_{dif1}$ and the second differential input pair transistor $N_{dif2}$ are respectively connected to a current source, the sources of the first differential input pair transistor $N_{dif1}$ and the second differential input pair transistor $N_{dif2}$ are connected through the first resistor R1. The drains of the first differential input pair transistor $N_{dif1}$ and the second differential input pair transistor $N_{dif2}$ are respectively connected to a load (respectively denoted as RL1 and RL2). The first differential input pair transistor $N_{dif1}$ and the second differential input pair transistor $N_{dif2}$ output a differential signal of each output.

As shown in FIG. 9 and FIG. 10, each compensation module is respectively connected to an output of the data input module 11, and the current data is compensated based on a logic value of the prior data of the current data $D_n$ and a feedback coefficient corresponding to the prior data, to obtain a compensation magnitude for the current data.

Specifically, in this embodiment, the number of the compensation module is three, which are referred to as a first compensation module 12a, a second compensation module 12b, and a third compensation module 12c, compensation is performed respectively based on three prior data adjacent to the current data $D_n$. The compensation modules have the same structure and provide different feedback coefficients. In this embodiment, the structure of each compensation module is described by taking the first compensation module 12a as an example. The first compensation module 12a includes a first compensation unit and a second compensation unit. The first compensation unit is connected to an inverted output of the data input module 11, the second compensation unit is connected to a positive output of the data input module 11. The first compensation unit and the second compensation are connected to the third prior data $D_{n-3}$ of the current data $D_n$, and the first compensation unit or the second compensation unit is selectively turned on based on a logic value of the third prior data $D_{n-3}$, so that the feedback coefficient is compensated to the original signal of the current data $D_n$.

More specifically, as an implementation example of this embodiment, as shown in FIG. 9, the first compensation unit includes a first switch k1, one node of the first switch k1 is connected to the inverted output of the data input module 11, and the other node is connected to the first compensation current $I_{3,0}$, the first compensation current $I_{3,0}$ is the compensation current corresponding to the feedback coefficient when the third prior data $D_{n-3}$ is at logic low. The second compensation unit includes a second switch k2, one node of the second switch k2 is connected to the positive output of the data input module 11, and the other node of the second switch k2 is connected to a second compensation current $I_{3,1}$, the second compensation current $I_{3,1}$ is the compensation current corresponding to the feedback coefficient when the third prior data $D_{n-3}$ is at logic high.

More specifically, as another implementation manner of this embodiment, as shown in FIG. 10, the first compensation unit includes a first NMOS transistor N1 and a second NMOS transistor N2, and sources of the first NMOS transistor N1 and the second NMOS transistor N2 are connected to the first compensation current $I_{3,0}$, drain of the first NMOS transistor N1 is connected to an inverted output of the data input module 11, and gate of the first NMOS transistor N1 is connected to an inverted output signal of the third prior data $D_{n-3}$. Drain of the second NMOS transistor N2 is connected to supply, and gate of the second NMOS transistor N2 is connected to a reference signal VCM. The second compensation unit includes a third NMOS transistor N3 and a fourth NMOS transistor N4. Sources of the third NMOS transistor N3 and the fourth NMOS transistor N4 are connected to a second compensation current $I_{3,1}$. Drain of the third NMOS transistor N3 is connected to supply. Gate of the third NMOS transistor N3 is connected to the reference signal VCM. Drain of the fourth NMOS transistor N4 is connected to a positive output of the data input module 11, gate of the fourth NMOS transistor N4 is connected to a positive output signal of the third prior data $D_{n-3}$. The structure of each compensation module is the same, and will not be described in detail herein.

As shown in FIG. 9 and FIG. 10, the comparison module 13 is connected to an output of the data input module 11, and compares the compensation amplitude $AMP_{compensation}$ of the current data with a decision threshold Vth to determine the logic value of the current data $D_n$.

Specifically, when the compensation amplitude $AMP_{compensation}$ of the current data $D_n$ is less than the decision threshold Vth, determining that the current data $D_n$ is at logic low, and when the compensation amplitude $AMP_{compensation}$ of the current data $D_n$ is greater than the decision threshold Vth, determining that the current data $D_n$ is at logic high.

Specifically, the current data $D_n$ after passing through the comparison module 13 is used as the first prior data of the subsequent data.

As shown in FIG. 9 to FIG. 10, each trigger module is in one-to-one correspondence with each compensation module, and is sequentially connected in series to the output end of the comparison module 13 to obtain the logic value of each prior data of the current data $D_n$.

Specifically, in this embodiment, including the first trigger module 14a and the second trigger module 14b, after successively passing each trigger module, the compensated data is used as the prior data of the subsequent data, and is used for compensation of the subsequent data.

Embodiment 3

Figure 11:
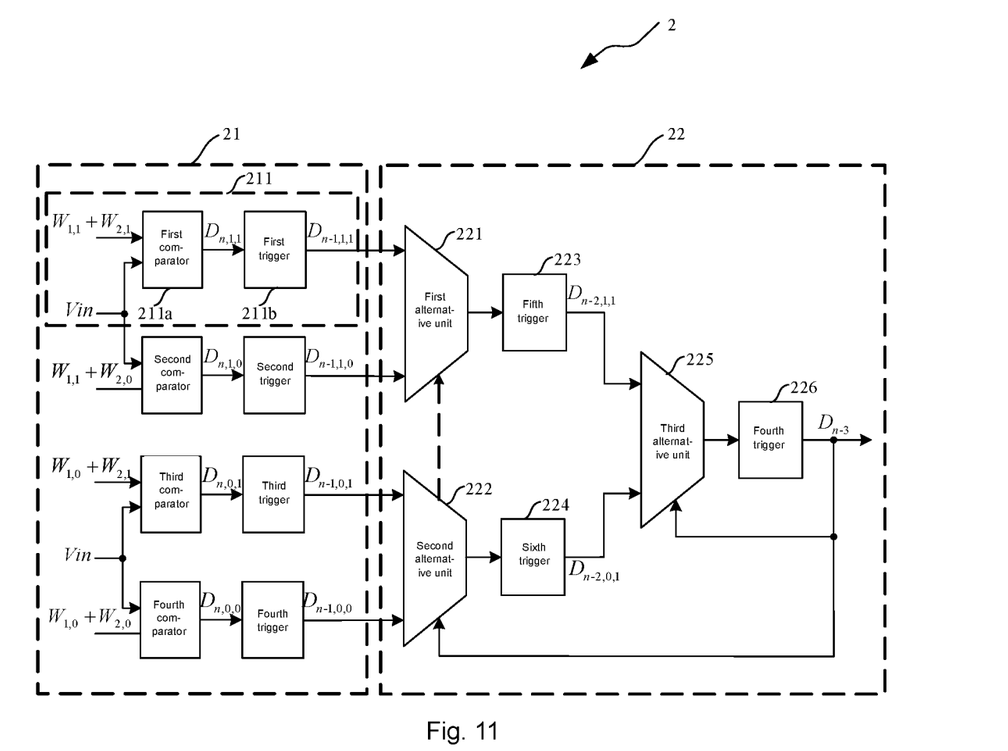
FIG. 11 is a diagram illustrating another example of the asymmetric decision feedback equalization according to the present disclosure.

As shown in FIG. 11, the present embodiment provides an asymmetric decision feedback equalization circuit 2 for implementing the asymmetric decision feedback equalization method of the embodiment 1, and the asymmetric decision feedback equalization circuit 2 includes: a compensation module 21 and a selection module 22.

As shown in FIG. 11, the compensation module 21 receives the input data Vin, compensates the amplitude of the current data based on the combination of different feedback coefficients corresponding to k prior data sequence, and latches the compensated data as the first prior data of the next current data.

Specifically, the compensation module 21 includes $2^k$ compensation units, each of the compensation units includes a comparator and a trigger. Each comparator receives the input data Vin and a combination of feedback coefficients corresponding to the sequence of each prior data, thus realizing compensation. In this embodiment, the first compensation unit 211 is taken as an example, and the compensation is performed based on two prior data. As shown in FIG. 11, the first compensation unit 211 includes a first comparator 211a and a first trigger 211b, the first comparator receives the input data Vin, the first prior data is an opposite number $W_{1,1}$ of a feedback coefficient corresponding to logic high, and the second prior data is an opposite number $W_{2,1}$ of a feedback coefficient corresponding to logic high (in actual use, the opposite number of the feedback coefficient can be replaced with each feedback coefficient, the same logical relationship is realized by the adjustment of the internal symbols), and the current data $D_n$ is compensated accordingly, thus obtaining the compensation signal $D_{n,1,1}$ when the adjacent two prior data are at logic high. After passing the first trigger 211b, the compensation signal is used as the first prior data of the subsequent data. The feedback coefficients received by the other compensation units are different combinations of the feedback coefficients of two prior data, which are not described in detail herein.

As shown in FIG. 11, the selection module 22 is connected to an output of the compensated module 21, and determines a feedback coefficient corresponding to each prior data step by step based on logic value of prior data of each output signal of the compensated module 21, thereby determining logic value of a current data after compensation.

Specifically, the selection module 22 includes k level alternative units and a trigger connected to each alternative unit, a number of alternative units at each level is decreasing exponentially by 2, and a feedback coefficient corresponding to a sequence of first prior data of data received by any alternative unit is different. In this embodiment, the selection module 22 includes 2 level alternative units, the first level alternative unit includes a first alternative unit 221 and a second alternative unit 222, the second level alternative unit includes a third alternative unit 225. The feedback coefficient corresponding to the sequence of the first prior data of the input data received by the first alternative unit 221 is the same, and the feedback coefficient corresponding to the sequence of the second prior data is different. The feedback coefficient corresponding to the sequence of the second prior data is determined based on the logic values of the second prior data of the input data received by the first alternative unit 221, and is output by a fifth trigger 223. Similarly, the data selected by the second alternative unit 222 is output by a sixth trigger 224. The third alternative unit 225 is connected to the output of the fifth trigger 223 and the sixth trigger 224. A feedback coefficient corresponding to the sequence of the first prior data is determined based on the logic value of the first prior data of the input data received by the third alternative unit 225, and is output by a seventh trigger 226, to obtain a compensation signal determined by each feedback coefficient.

It should be noted that the implementation mode of the asymmetric decision feedback equalization method in the first embodiment includes but is not limited to the modes of embodiment 2 and embodiment 3, and details are not described herein.

Embodiment 4

Figure 12:
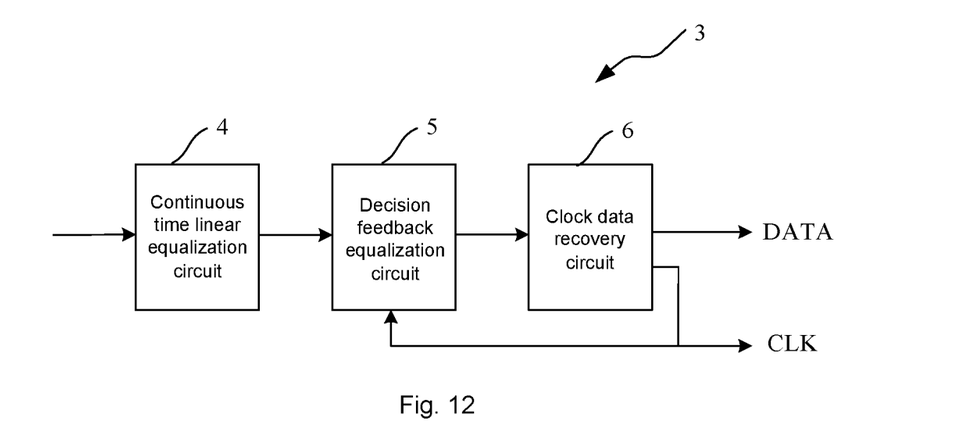
FIG. 12 is a diagram illustrating architecture of nonlinear receiver according to the present disclosure.

As shown in FIG. 12, this embodiment provides a nonlinear receiver 3, including:

A continuous time linear equalization (CTLE) circuit 4, an asymmetric decision feedback equalization (ADFE) circuit 5 and a clock data recovery (CDR) circuit 6.

As shown in FIG. 12, the continuous time linear equalization circuit 4 receives an electrical signal converted from an optical signal emitted by a laser device and improves the performance of the electrical signal.

Specifically, the continuous time linear equalization circuit 4 can effectively improve the performance of the eye diagram of the receiver side in a link with a large transmission loss.

As shown in FIG. 12, the asymmetric decision feedback equalization circuit 5 is connected to the output of the continuous time linear equalization circuit 4 to compensate the signal output by the continuous time linear equalization circuit 4.

Specifically, the asymmetric decision feedback equalization circuit 5 compensates the data based on the method of embodiment 1, and the implementation thereof includes, but is not limited to, the second embodiment and the third embodiment.

Figure 13:
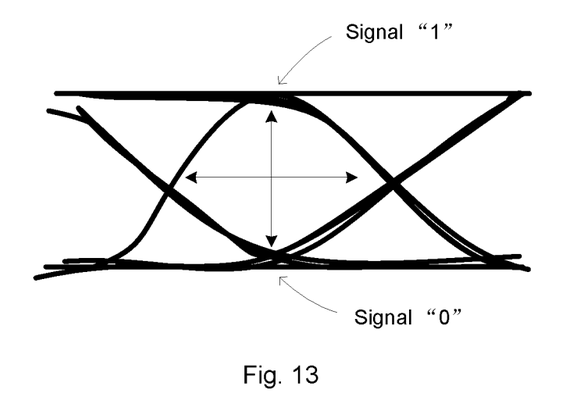
FIG. 13 is a diagram illustrating an eye diagram after compensation according to the present disclosure.

As shown in FIG. 13, in the compensated signal eye diagram output by the asymmetric decision feedback equalization circuit 5 of the present disclosure, the effective eye height and eye width are increased, and the signal deterministic jitter is reduced, which is advantageous for the sampling judgment and locking of the clock recovery circuit, thus reducing the error of the receiver and improving the robustness of the entire optical to electrical conversion system.

As shown in FIG. 12, the clock data recovery circuit 6 is connected to the output end of the asymmetric decision feedback equalization circuit 5 for recovering the sampling clock and data in the output signal of the asymmetric decision feedback equalization circuit 5.

In summary, the present disclosure provides the nonlinear receiver, the asymmetric decision feedback equalization circuit and method, the method includes: converting the optical signal emitted by the laser device into the electrical signal; obtaining the actual amplitude of current data in the electrical signal, and compensating the current data based on the logic value of k prior data of the current data and the feedback coefficient corresponding to the prior data, to obtain the compensation amplitude of the current data; comparing the compensation amplitude of the current data with the decision threshold to determine the logic value of the current data; the feedback coefficient is the absolute value of the influence amount of the prior data on the amplitude of the current data, and k is a positive integer.

The nonlinear receiver and the asymmetric decision feedback equalization circuit and method of the present disclosure overcome the problem of reduced sampling timing margin due to the asymmetric optical eye diagram by adjusting the feedback coefficient compensated data under different data sequences, thus improving the system robustness under different processes, supply voltages and temperatures, reducing the jitter of the sampling clock recovered by the clock recovery circuit at the same time, thereby reducing the system error rate. Therefore, the present disclosure effectively overcomes various shortcomings in the prior art and has high industrial utilization value.

The above-mentioned embodiments are just used for exemplarily describing the principle and effects of the present disclosure instead of limiting the present disclosure. Those skilled can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. An asymmetric decision feedback equalization method, at least comprising:
converting an optical signal emitted by a laser device into an electrical signal;

obtaining a compensation amplitude of a current data in the electrical signal by obtaining an actual amplitude of the current data, and compensating the current data based on a logic value of k prior data of the current data and a feedback coefficient corresponding to the prior data, wherein the compensating of the current data comprises:
sequentially acquiring the prior data of the current data to obtain the compensation amplitude of the current data, wherein
when the prior data is at logic high, subtracting the feedback coefficient corresponding to the prior data from the actual amplitude of the current data, and
when the prior data is at logic low, adding the feedback coefficient corresponding to the prior data to the actual amplitude of the current data; and
comparing the compensation amplitude of the current data with a decision threshold to determine a logic value of the current data,
wherein the feedback coefficient is an absolute value of an influence amount of the prior data on an amplitude of the current data, and k is a positive integer.

2. The asymmetric decision feedback equalization method according to claim 1, further comprising:
acquiring a logic value of each prior data;
obtaining a compensation value by multiplying the logic value of each prior data with a corresponding feedback coefficient, then inverting a product of the logic value of each prior data and the corresponding feedback coefficient; and
adding each compensation value and adding the added compensation value to the actual amplitude of the current data, to obtain the compensation amplitude of the current data.

3. The asymmetric decision feedback equalization method according to claim 1, wherein obtaining the feedback coefficient comprises:
when the laser device emits a logic high pulse, obtaining the absolute value of the influence amount of the prior data on the amplitude of the current data when the prior data is at logic high based on a waveform of the logic high pulse; and
when the laser device emits a logic low pulse, obtaining the absolute value of the influence amount of the prior data on the amplitude of the current data when the prior data is at logic low based on a waveform of the logic low pulse.

4. An asymmetric decision feedback equalization circuit, at least comprising:
a data input module to receive input data and output a differential signal of each data;
k compensation modules respectively connected to an output end of the data input module, to obtain a compensation amplitude of a current data by compensating the current data based on the logic value of a prior data of the current data and an feedback coefficient corresponding to the prior data;
a comparison module connected to an output end of the data input module, to compare the compensation amplitude of current data with a decision threshold, to determine a logic value of the current data; and
k trigger modules in one-to-one correspondence with the compensation modules, sequentially connected in series to an output end of the comparison module to sequentially obtain a logic value of each prior data of the current data,
wherein k is a positive integer.

5. The asymmetric decision feedback equalization circuit according to claim 4, wherein the compensation module comprises a first compensation unit and a second compensation unit, wherein
the first compensation unit is connected to an inverted output of the data input module;
the second compensation unit is connected to a positive output of the data input module; and
the first compensation unit and the second compensation unit are connected to the same prior data, and the first compensation unit or the second compensation unit is selectively turned on based on the logic value of the prior data.

6. The asymmetric decision feedback equalization circuit according to claim 5, wherein
the first compensation unit comprises a first switch, one end of the first switch is connected to an inverted output of the data input module, the other end of the first switch is connected to a first compensation current; and
the second compensation unit comprises a second switch, one end of the second switch is connected to the positive output of the data input module, and the other end of the second switch is connected to a second compensation current.

7. The asymmetric decision feedback equalization circuit according to claim 5, wherein
the first compensation unit comprises a first NMOS transistor and a second NMOS transistor, wherein
sources of the first NMOS transistor and the second NMOS transistor are connected to the first compensation current,
a drain of the first NMOS transistor is connected to the inverted output of the data input module,
a gate of the first NMOS transistor is connected to an inverted output signal of the prior data,
a drain of the second NMOS transistor is connected to supply, and
a gate of the second NMOS transistor is connected to a reference signal; and
the second compensation unit comprises a third NMOS transistor and a fourth NMOS transistor, wherein
sources of the third NMOS transistor and the fourth NMOS transistor are connected to the second compensation current,
a drain of the third NMOS transistor is connected to supply,
a gate of the third NMOS transistor is connected to the reference signal,
a drain of the fourth NMOS transistor is connected a positive output of the data input module, and
a gate of the fourth NMOS transistor is connected to a positive output signal of the prior data;
wherein the reference signal is between an inverted signal and a positive signal of the prior data.

8. An asymmetric decision feedback equalization circuit, at least comprising:
a compensation module to respectively compensate an amplitude of a current data based on a combination of different feedback coefficients corresponding to a sequence of k prior data, and latch the compensation data as a prior data of a next current data; and
a selection module connected to an output of the compensation module, to determine feedback coefficients corresponding to each prior data, thereby determining the amplitude of the current data after compensation;
wherein k is a positive integer.

9. The asymmetric decision feedback equalization circuit according to claim 8, wherein
- the selection module comprises k level alternative units and triggers connected to each alternative unit;
- a number of alternative units at each level is decreasing exponentially by 2; and
- feedback coefficients corresponding to the sequence of the prior data are different.

10. A non-linear receiver, at least comprising:
- a continuous time linear equalization circuit to receive an electrical signal converted by an optical signal emitted by a laser device, and improve performance of the electrical signal;
- an asymmetric decision feedback equalization circuit according to claim 8, connected to an output of the continuous time linear equalization circuit, to compensate a signal after continuous time linear equalization circuit; and
- a clock data recovery circuit connected to an output of the asymmetric decision feedback equalization circuit, to recover a sampling clock and data.

\* \* \* \* \*